United States Patent [19]

Maly

[11] Patent Number: 4,463,135

[45] Date of Patent: Jul. 31, 1984

[54] PROCESS FOR THE FUNCTIONALIZATION OF POLYSTYRENE RESINS

[75] Inventor: Neil A. Maly, Tallmadge, Ohio

[73] Assignee: The Goodyear Tire & Rubber Company, Akron, Ohio

[21] Appl. No.: 436,475

[22] Filed: Oct. 25, 1982

[51] Int. Cl.$^3$ .............................................. C08F 8/42
[52] U.S. Cl. .................................... 525/123; 525/279; 525/297; 525/337; 525/340; 525/354; 525/364; 525/366; 525/374; 525/375; 525/383; 525/359.5
[58] Field of Search ............... 525/366, 364, 123, 279, 525/297, 337, 340, 354, 359.5, 374, 383, 375

[56] References Cited

U.S. PATENT DOCUMENTS

| | | | |
|---|---|---|---|
| 3,234,193 | 2/1966 | Leavitt | 525/366 |
| 4,076,914 | 2/1978 | Moczygemba et al. | 525/366 |
| 4,076,915 | 2/1978 | Trepka | 525/366 |

Primary Examiner—Joseph L. Schofer
Assistant Examiner—Bernard Lipman
Attorney, Agent, or Firm—D. O. Nickey

[57] ABSTRACT

There is disclosed a process for the functionalization of polymeric resins, wherein a halo-methylated resin, with a crosslink density of at least 4 percent is reacted with an alkyllithium wherein the alkyl radical is 1 to 12 carbon atoms; followed by a reaction to produce a polymeric material having a desired pendant functionality. Materials produced from the process of this invention have utility as intermediates in the production of polymer-bound catalysts and exchange resins.

3 Claims, No Drawings

PROCESS FOR THE FUNCTIONALIZATION OF POLYSTYRENE RESINS

TECHNICAL FIELD

This invention relates to functionalized resins that are prepared from halo-methylated polystyrene wherein the halo-methylated polystyrene with a crosslink density of at least 4 percent is reacted with an alkyllithium, i.e. n-butyllithium or tertiary-butyllithium to produce the intermediate "polymer-bound benzyllithium" which is used to prepare functionalized resins containing various pendant functional groups.

BACKGROUND ART

Functionalized resins have found numerous applications recently as supports in solid phase synthesis, reagents or protecting groups in organic synthesis and supports for chromatography or catalysis. The reactions which are used in the functionalization of insoluble resins are similar to those carried out on soluble materials, but are usually more difficult to control and evaluate owing to the insolubility of the resins.

A large number of the functional resins which have been prepared to date were synthesized by chemical modifications of crosslinked polystyrene. It is known that solvent soluble resins are usually more reactive and often give better yields than their macroreticular counterparts.

Numerous publications indicate that it is not possible to prepare benzyllithium by reacting benzyl halides with alkyllithiums because of Wurtz coupling. Gilman & Haubein, J. Am. Chem. Soc. 66, 1515 (1944); Perrine & Rapoport, Analytical Chem. Vol. 20, 635, (1948); *Organometallic Derivatives of the Main Group Elements* by Azlett (ed.) (1972); *The Chemistry of Organolithium Compounds* by Wakefield, 153 (1976). In these failures no benzyllithium was obtained, only trans-Stilbene and Wurtz coupling products formed. Thus, a skilled artisan would assume that a reaction between a halomethylated polystyrene with alkyllithiums would result in Wurtz coupling. One aspect of the present invention involves the discovery that polymer-bound benzyllithium can be prepared by reaction with an alkyllithium, if the starting halo-methylated resin has a crosslink density of at least 4 percent but less than 75 percent.

The prior art does disclose the preparation of non-polymer-bound benzyllithium from both methylbenzyl ether and tris(benzyl) tin chloride. Gilman and McNinch, "*Direct Preparation of Benzyllithium and Methylbenzyllithium in Tetrahydrofuran*", Journal of Organic Chemistry, 26, 3723–5, (1961) and D. Seyferth et al, *The Preparation of Organolithium Compounds by the Transmetalation Reaction*, J. Organometal Chem., Vol. 2, 431–3, (1964). However, a polymer-bound benzyllithium preparation has not been reported by any of the numerous references concerned with the functionalization of polystyrene resins. The prior art does not suggest or disclose the reaction of at least 4 percent crosslinked halomethylated resin with alkyllithium to produce the valuable intermediate "polymer-bound benzyllithium."

One aspect of the present invention is directed to the discovery that polymers consisting essentially of the monomers:styrene, vinyl benzyl chloride and divinylbenzene, that have a crosslinking (divinylbenzene content) of at least 4 but not more than 75 percent (by weight) will undergo a direct lithiation process without extensive Wurtz coupling.

Previous investigators have prepared functionalized polymers via copolymerization of substituted styrene monomers plus styrene and/or divinylbenzene to give the functionalized polymers directly. Introduction of functional groups onto styrene polymers by copolymerization of suitably functionalized styrene monomers is often difficult due to the insolubility or reactivity of the functionalized monomers. Further, reactivity differences may cause blocks to form which will result in the formation of undesirable polymers.

DISCLOSURE OF THE INVENTION

There is disclosed a process for the functionalization of polymeric resins wherein a halo-methylated polystyrene resin with a crosslink density of at least 4 but not more than 75 percent is reacted with an alkyllithium wherein the alkyl radical is from 1 to 12 carbon atoms to produce the intermediate "polymer-bound benzyllithium" that readily undergoes reaction with numerous compounds to produce polystyrene resins containing various pendant functional groups.

One aspect of the present invention contemplates a process wherein functionalized polystyrene resin can be more readily obtained in a much more economical and controllable manner. Specifically, the process of this invention is directed to the use of a polymer which contains a halo-methylated pendant functionality and that has at least a crosslinked density (divinylbenzne content) of at least 4 percent but not more than 75 percent by weight of total monomers. It has been determined that halo-methylated polystyrene resins can be readily reacted with alkyllithium such as n-butyllithium and tertiary-butyllithium to provide a reactive intermediate that readily undergoes reaction with numerous compounds to produce polystyrene resins containing various functional groups.

There is also disclosed a process for modifying halomethylated polystyrene resins wherein the polystyrene resin has a crosslink density of at least 4 percent, said polystyrene resin is reacted with an alkyllithium, the alkyl radical being from 1 to 12 carbon atoms; to produce a polymer bound benzyllithium which can be applied to the preparation of polystyrene resins containing various functional groups.

There is further disclosed a process to prepare a polymer containing pendant benzyllithium functionality which comprises reacting a polymer that contains pendant halomethyl functionality and has a crosslink density of at least 4 percent but not more than 75 percent with an alkyllithium wherein the alkyl radical has 1 to 12 carbon atoms; under anhydrous conditions.

MORE DETAILED DISCLOSURE

The halo-methylated polystyrene resin starting material should be macroreticular or macroporous. The process of the present invention is advantageous over the presently known routes in that the reaction of n-butyllithium with a halo-methylated styrene resin is simple, more direct, less costly, less toxic, and more controllable, than the presently accepted methods of preparation of functionalized resins. The process of the present invention also allows for the advantageous spacing of the functional moiety from the polymer backbone which is known to be advantageous by numerous investigators. Numerous investigators, however, have been hampered by their synthesis routes in spacing the catalytic functional moiety from the polymer backbone as evidenced by the Molinari-Montanari reference cited above.

Representative of the polymeric materials or macroreticular resins that are useful as a starting material in the present invention are those polymers that are prepared by suspension free radical polymerization wherein a mixture of styrene, vinyl benzyl chloride and at least 4 percent by weight (of total monomers) of divinylbenzene are polymerized or polymerization of styrene and divinylbenzene followed by halo-methylation. See for example, *Polymers as Aids in Organic Chemistry* by N. K. Matthew, C. K. Narang and R. E. Williams (1980), 18–20. The resin should be macroporous or a macroreticular resin. See "*Polymer Supported Reactions in Organic Synthesis*" ed. by P. Hodge and D. C. Sherrington (1980) pages 16–20.

Suitable starting resins include polymers prepared by suspension polymerizations that include solvating diluent, nonsolvating diluent and linear polymers in the polymerization mixture. (See J. of Applied Polymer Science, 17, 2835–46 (1973).

It should be realized that minor amounts of other monomers may be present in the resin. These other monomers should not adversely effect the final crosslink density or the reactivity of the pendant halomethylated functionality.

Representative of the alkyllithiums that can be used in the process of the present invention are methyllithium, butyllithium, ethyllithium, tertiary-butyllithium, pentyllithium, tertiary-pentyllithium, hexyllithium, octyllithium and dodecyllithium.

The alkyllithiums react with the halomethylated resin to form "polymer-bound benzyllithium." This polymer-bound benzyllithium may then be reacted with a complexing group to produce a polymer-bound ligand. Ligands are complexing groups in coordination chemistry. The ligand may be a molecule, an ion or an atom which can be attached to a central atom of a coordination compounds, a chelate or other complex.

The "polymer-bound benzyllithium" is an intermediate which can be used to prepare resins that contain various pendant functional groups or chemically bound catalysts. For example, groups such as:

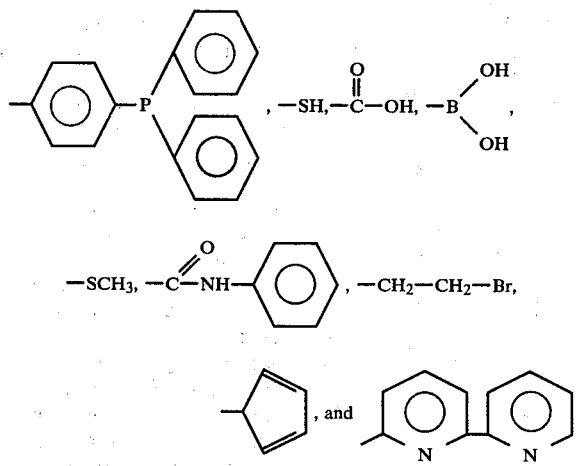

can be attached to the polymer with known reactions. See *J. Org. Chem.* 41, 3879 (1979). These attached ligands can then be reacted with metal salts to prepare polymer-bound catalysts.

BEST MODE FOR CARRYING OUT THE INVENTION

The following examples are intended to illustrate and not to limit the process of the present invention.

EXAMPLE 1

Preparation of a Halomethylated Polystyrene

A one-liter 3-neck flask as charged with 400 grams of distilled water and 100 grams of toluene. A thermometer, air driven stirrer, nitrogen inlet/exit and condenser were attached to the reaction flask. The system was under constant nitrogen purge during both charging and polymerization cycles. Before adding cellulose the stirring speed was set at a range from 1600 to 1700 rpm's and then 6 grams of 7M (Hercules, Inc.) molar type cellulose was added. After two or three minutes of mixing 66.7 ml of styrene, 9.3 ml of vinylbenzylchloride and 59.8 ml of divinylbenzene were added to the reaction vessel. It should be noted that impurities are not counted in the final 60/30/10 (styrene/divinylbenzene/vinylbenzylchloride) polymer mix. Divinylbenzene was only 55 percent pure with the remaining 45 percent being inpurities such as ethyl vinylbenzene and diethylbenzene. Then 1.1 grams of 2,2'-azobis(2-methylpropionitrile), also known as AIBN was added as the initiator. The mixture was rapidly warmed to 55° C. and allowed to exotherm to approximately 86° C. After several hours the reactor was cooled and the reaction mixture was poured into a large excess of water (3 liters) and filtered through 100 mesh 316 stainless steel screen. The resin was then washed extensively with water, methanol and acetone before being air dried at 50° C. 111.5 grams of resin product was obtained that was composed of approximately 60 percent styrene, 10 percent vinylbenzylchloride and 30 percent divinylbenzene segmeric units.

EXAMPLE 2

Preparation of Polymer-Bound Benzyllithium

Polymer-bound benzyllithium was prepared by reacting the chloromethylated polystyrene from Example 1 with butyllithium. Since alkyllithiums will react with both air and moisture no attempt was made to isolate the polymer-bound benzyllithium. Although direct proof of benzyllithium formation cannot be obtained it is possible to obtain proof that polymer bound benzyllithium formed with 2,2'-dipyridyl ligand forming reactions.

A one liter 3-neck flask equipped with a 1¾ inch coarse frit, rubber septum, nitrogen inlet/exit, thermometer, and teflon stirrer was dried with a heat gun while being flushed with nitrogen. The reactor system was charged with 116.3 grams (50.0 millimoles chlorine) of the resin prepared in Example 1 and added thereto was 600 milliliters of THF. The reaction mixture was then cooled to 0° C. and n-butyllithium (110.00 millimoles in a hexane solvent 2.3 molar) was slowly syringed into the cold reaction mixture to keep the temperatures near 0° C. After 45 minutes at 0° C. the temperature was allowed to warm to room temperature where it was maintained for an additional hour. The resin contained in the THF was maroon in color. After the polymer-bound benzyllithium was prepared, solid 2,2-dipyridyl (18.74 grams) was added and the reaction mixture was heated to reflux. After 3 hours at reflux the black reaction mixture was cooled to room temperature and air was bubbled through the pot. When a gold color prevailed the reaction mixture was filtered and the golden resin was washed with water (1500 milliliters), acetone (1500 milliliters), tetrahydrofuran (1500 milliliters), tetrahydrofuran/H₂O in a 1:1 molar ratio (1500 milliliters), acetone (500 milliliters) and finally hexane (500 milliliters). The dried resin (117.2 grams) contained 0.42 percent nitrogen and 0.36 percent chlorine.

EXAMPLE 3

Criticality of Crosslinking in the Preparation of "Polymer-Bound Benzyllithium"

The following experiments were conducted to demonstrate that uncrosslinked chloromethylated polystyrene and benzyl chloride react with an alkyllithium in the same way to produce Wurtz coupling products. This experiment demonstrates that at least 4 percent crosslinking is required to achieve acceptable amounts of "polymer bound benzyllithium."

Step 1

Polymer Preparation

In a reaction vessel and procedure according to Example 1, 90 g styrene, 10 g vinylbenzyl chloride (VBC) and 0.4 g of 2,2'-azobis(2-methylpropionitrile) [AIBN] were charged to a N₂ flushed bottle and polymerized 48 hours at 60° C. The resin was then broken up and used for the n-butyllithium reaction.

Step 2 n-Butyllithium Reaction

To a 500 ml 3-neck reaction flask equipped with a rubber septum, N₂ inlet/exit, thermometer, condenser and teflon stirrer was added 20 g of the resin prepared in Step 1 above ($\approx$13.1 millimoles of Cl), and 300 ml of CaCl₂ dried THF. The flask was previously flushed with N₂ and then heated to provide an essentially anhydrous environment. The resin and THF were stirred for 2–3 hours to completely dissolve the resin. During this time N₂ flow was terminated although the N₂ atmosphere was maintained with a balloon. After the reaction mixture was cooled to 0° C., n-butyllithium was added. This caused the reaction mixture to solidify into a purple jello-like mass in less than one minute. Additional THF (100 ml) failed to dissolve the mass. After the reaction was complete, excess n-butyllithium was destroyed with 50 ml of CH₃OH. The polymer was precipitated by pouring the reaction mixture into 1200 ml of CH₃OH. Then the polymer was isolated by filtration and dried at 50° C. in a vacuum oven.

Step 3

Polymer Extractions

To determine percent gel content $\approx$2.0 g of the reaction product from Steps 1 and 2 (Example 3) were weighed into cellulose extraction thimbles. These thimbles were placed in a soxhlet extractor and extracted for 5 days with toluene. When the extraction was complete the extraction thimbles were dried in a vacuum oven at 50° C. and conditioned 24 hours in air before reweighing. The results for the polymer from Step 1 showed 0.45 gel and the polymer from Step 2 (the lithium reaction) showed 106.4 percent gel.

From this Example it is evident that chloromethylated polystyrene (nominally 90 percent styrene/10 percent vinyl benzyl chloride, with $\approx$0.5 percent gel) was completely gelled (crosslinked) by reaction with n-butyllithium. The newly formed crosslink may be due to

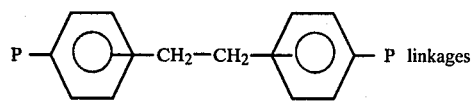

since

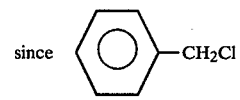

reacted to form

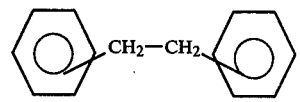

in the presence of alkyllithium in a similar reaction.

Other polymers were prepared and reacted in a similar manner with n-butyllithium except that the percentage of divinylbenzene and styrene were varied. The polymers after lithiation were then reacted with bipyridyl and a percent yield to bipyridyl and percent selectivity were determined. Table I sets out the data and results. All monomer ratios are based upon charged monomers by weight.

TABLE I

| Styrene/ VBC/ DVB | % Conv(Cl) | % Yield (to bipy) | % Sel. P—⌬—CH₂—⌬—⌬ N  N |
|---|---|---|---|
| 90/9/1 | 99.2 | 6.2 | 6.3 |
| 80/10/4 | 98.7 | 21.1 | 21.4 |
| 82/10/8 | 98.5 | 21.8 | 22.1 |
| 78/10/12 | 98.5 | 20.2 | 20.5 |
| 60/10/30 | 75.4 | 36.3 | 48.1 |

Note the large jump between 1 and 4 percent crosslinked resin. This is evidence that at least 4 percent crosslinking is required to produce a polymer bound benzyllithium that will react to produce the polymer with the desired pendant functionality in acceptable yield and selectivity.

EXAMPLE 4

Preparation of Polymer-Bound Pd.Cl₂

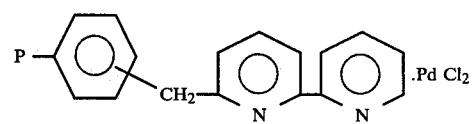

A 250 ml three-neck reaction flask fitted with a thermometer, nitrogen inlet/exit and a magnetic stirring bar was flushed with a nitrogen stream. 10 grams of the resin containing dipyridyl functionality from Example 2 was placed in the reaction vessel. 0.797 gms (4.495 millimole) of PdCl₂, 125 mls of methanol and 125 mls of ethyl acetate were added and a balloon was used to maintain the N₂ atmosphere. This mixture was then stirred overnight at ≈25° C.

The reaction mixture was then filtered. The filtrate was a dark brown-black and the resin was black. The resin was washed with 200 ml of methanol, 1000 ml of a 50/50 THF/methanol solution, 1000 ml of acetone and finally 500 ml of hexane. 10.24 gms of material was obtained that was coal black in color. Elemental analysis determined that the resin contained 0.36% N, 1.54% Pd and 1.03% Cl by weight.

EXAMPLE 5

Preparation of Metal Chloride Complexes of Polymer-Bound 2,2'-bipyridyl

In a manner similar to Example 4 polymer-bound bipyridyl was reacted with different metal chlorides.

The following metal chloride products were obtained:

(1) CuCl, green product contained 2.03% Cu, and 1.01% Cl by wt.,
(2) CoCl₂:6H₂O, green product contained 0.37% Co, 0.51% Cl and 0.32% N,
(3) NiCl₂.6H₂O, orange product contained 0.43% Ni, 0.42% Cl and 0.26% N.

EXAMPLE 6

Use of the Catalyst Prepared by the Process of the Present Invention

One gram of resin obtained from Example 4 above was activated by reaction with 2 grams of NaBH₄ in a dry ethanol solvent (25 milliliters). After 2 hours of washing with 2-butyl alcohol, petroleum ether and pentane, the resin was placed in an autoclave. To the resin so prepared was added 15 milliliters of cyclohexane (internal standard) 12.3 milliliters (0.1 mole) of 1,5-cyclooctadiene and 400 milliliters of pentane. The autoclave was closed and the air evacuated. The hydrogenation was initiated when hydrogen was added to the autoclave. During the room temperature reaction the pressure was allowed to drop to 100 psi before being increased to 450 psi again. After 5.1 hours at 23° C. (approximately pressure of 300 psi) a sample was taken and analyzed by gas chromatography. It was determined that 93.1 percent of the 1,5-cyclooctadiene was converted at a selectivity of 89.2 percent to cyclooctene.

EXAMPLE 7

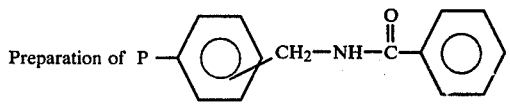

A 250 ml three-neck reaction flask fitted with a mechanical stirrer condenser, N₂ inlet/exit, thermometer and rubber septum was flushed with N₂ and cooled to 0° C. 20 grams of a chloromethylated polystyrene resin (≈8.4 millimole Cl), prepared in a manner similar to Example 1 was placed in the reaction flask along with 150 ml of spec. grade toluene. 8.22 ml (18.916 millimole) of N-butyllithium was added to the N₂ flushed system and the mixture was maintained at 0° C. for 45 minutes. The reaction mixture was then allowed to warm to room temperature and maintained for 1 hour. 4.67 ml (35.7931 millimole) of phenylisocyanate was then added. Room temperature was maintained for 15 minutes and then the mixture was heated to 65° C. and maintained for 30 minutes.

The white resin was isolated and washed with ethanol, THF, H₂O, THF/H₂O 2:1, THF and a 1:1 mixture of THF/MeOH. The resin was then extracted overnight with THF/MeOH. Analysis of the dried resin determined 0.24 percent N by weight.

From these examples it is evident that chloromethylated resins with a crosslink density of at least 4% can be used to prepare polymer-bound benzyllithium which reacts readily with numerous compounds to obtain polymers with useful and various pendant functionalities. For example, the polymer bound 2,2'-bipyridyl is readily obtained from the polymer-bound benzyllithium wherein 76 percent of the pendant chlorine was converted to bound bipyridyl with 45.6 percent selectivity (assuming all the nitrogen was in the bipyridyl). When the same reactions were carried out on a gel resin the final resin contained only 0.12 percent N and 0.02 percent Cl (99 percent conversion and 5.8 percent selectivity).

INDUSTRIAL APPLICABILITY

The process of the present invention would greatly enhance the industrial use of polymer-bound catalysis since the present invention provides a method of preparing functionalized resins that is easy, economical and straight forward. It is believed that polymer bound catalysis, in general, will greatly lessen the cost of production of many chemicals. Polymer-bound benzyllithiums, in and of themselves, cannot be used as catalysts, however, the major value of this intermediate is its ability to be used in the preparation of many different polymer-bound catalysts. It is evident that the process of this invention would greatly enhance the production of polymer-bound catalysts and that a highly reactive and desirable functionalized polystyrene resin can be obtained in good yields and good purities.

While certain representative embodiments and details have been shown for the purpose of illustrating the invention, it will be apparent to those skilled in this art that various changes and modifications may be made therein without departing from the scope of the invention.

What is claimed is:

1. A process for the functionalization of a halomethylated polystyrene resin that contains at least 4 percent but more than 75 percent by weight divinylbenzene which comprises (A) contacting said resin in an anhydrous environment with alkyllithium wherein the alkyl radical is of 1 to 12 carbon atoms at a temperature of 0° C.; (B) warming the mixture to ambient temperature and then adding at least one compound selected from the group consisting of: 2,2'-dipyridyl, phenylisocyanate, triphenylphosphine, sulfur, trimethyl borate, 1,2-dibromoethane, N,N-dimethylformamide, cyclopentadiene and carbon dioxide; (C) heating the mixture to reflux and thereafter (D) filtering the mixture to obtain the functionalized resin.

2. A process for the preparation of a resin having catalytic functionality which comprises (A) contacting a halo-methylated polystyrene resin that contains at least 4 percent but not more than 75 percent by weight divinylbenzene in an anhydrous environment with alkyllithium, wherein the alkyl radical is of 1 to 12 carbon atoms at a temperature of 0° C.; (B) warming the mixture to ambient temperature and then adding at least one compound selected from the group consisting of: 2,2'-dipyridyl, phenylisocyanate, triphenylphosphine, sulfur, trimethyl borate, 1,2-dibromoethane, N,N-dimethylformamide, cyclopentadiene and carbon dioxide; (C) heating the mixture to reflux and thereafter (D) contacting the reaction product with a metal complex selected from the group consisting of CuCl, CoCl$_2$, NiCl$_2$ and PdCl$_2$ to obtain the resin having catalytic functionality.

3. A process according to claim 2 wherein the alkyllithium is n-butyllithium, the compound is 2,2'-dipyridyl and the metal complex is PdCl$_2$.

* * * * *